United States Patent
Jagannath et al.

(10) Patent No.: US 7,095,740 B1
(45) Date of Patent: Aug. 22, 2006

(54) METHOD AND APPARATUS FOR VIRTUAL OVERLAY NETWORKS

(75) Inventors: Shantigram Jagannath, Cambridge, MA (US); Naganand Doraswamy, Woburn, MA (US); Andre Fredette, Groton, MA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/109,343

(22) Filed: Jun. 30, 1998

(51) Int. Cl.
*H04L 12/28* (2006.01)
(52) U.S. Cl. .................. 370/392; 370/400; 370/401
(58) Field of Classification Search ........... 370/389, 370/392, 393, 400, 401, 397
See application file for complete search history.

(56) References Cited

U.S. PATENT DOCUMENTS

| | | | | |
|---|---|---|---|---|
| 5,583,862 A | * | 12/1996 | Callon | 370/397 |
| 5,798,706 A | * | 8/1998 | Kraemer et al. | 370/401 |
| 5,852,607 A | * | 12/1998 | Chin | 370/401 |
| 6,032,118 A | * | 2/2000 | Tello et al. | 379/212.01 |
| 6,081,524 A | * | 6/2000 | Chase et al. | 370/389 |
| 6,172,980 B1 | * | 1/2001 | Flanders et al. | 370/401 |
| 6,173,399 B1 | * | 1/2001 | Gilbrech | 709/247 |
| 6,188,671 B1 | * | 2/2001 | Chase et al. | 370/232 |
| 6,226,748 B1 | * | 5/2001 | Bots et al. | 713/153 |
| 6,226,751 B1 | * | 5/2001 | Arrow et al. | 370/409 |
| 6,330,614 B1 | * | 12/2001 | Aggarwal et al. | 370/471 |
| 6,339,595 B1 | * | 1/2002 | Rekhter et al. | 370/392 |
| 6,438,127 B1 | * | 8/2002 | Le Goff et al. | 370/389 |
| 6,466,985 B1 | * | 10/2002 | Goyal et al. | 370/236 |

* cited by examiner

*Primary Examiner*—Andrew C. Lee
(74) *Attorney, Agent, or Firm*—Blakely Sokoloff Taylor & Zafman LLP

(57) ABSTRACT

A method and apparatus for directing messages through a network wherein multiple tables for directing messages through the network are maintained and provided. Each table corresponds to a virtual private network and contains routing information specific to that virtual private network. A separate routing table is maintained for each VPN. In one embodiment the messages are forwarded using plain IP forwarding using a route table associated with the VPN. In another embodiment separate forwarding tables using labels are generated for each virtual private network. The messages are forwarded by looking up the label in the table corresponding to the VPN In a third embodiment, a single forwarding table is utilized where the table is built based on separate routing tables for each virtual private network.

23 Claims, 7 Drawing Sheets

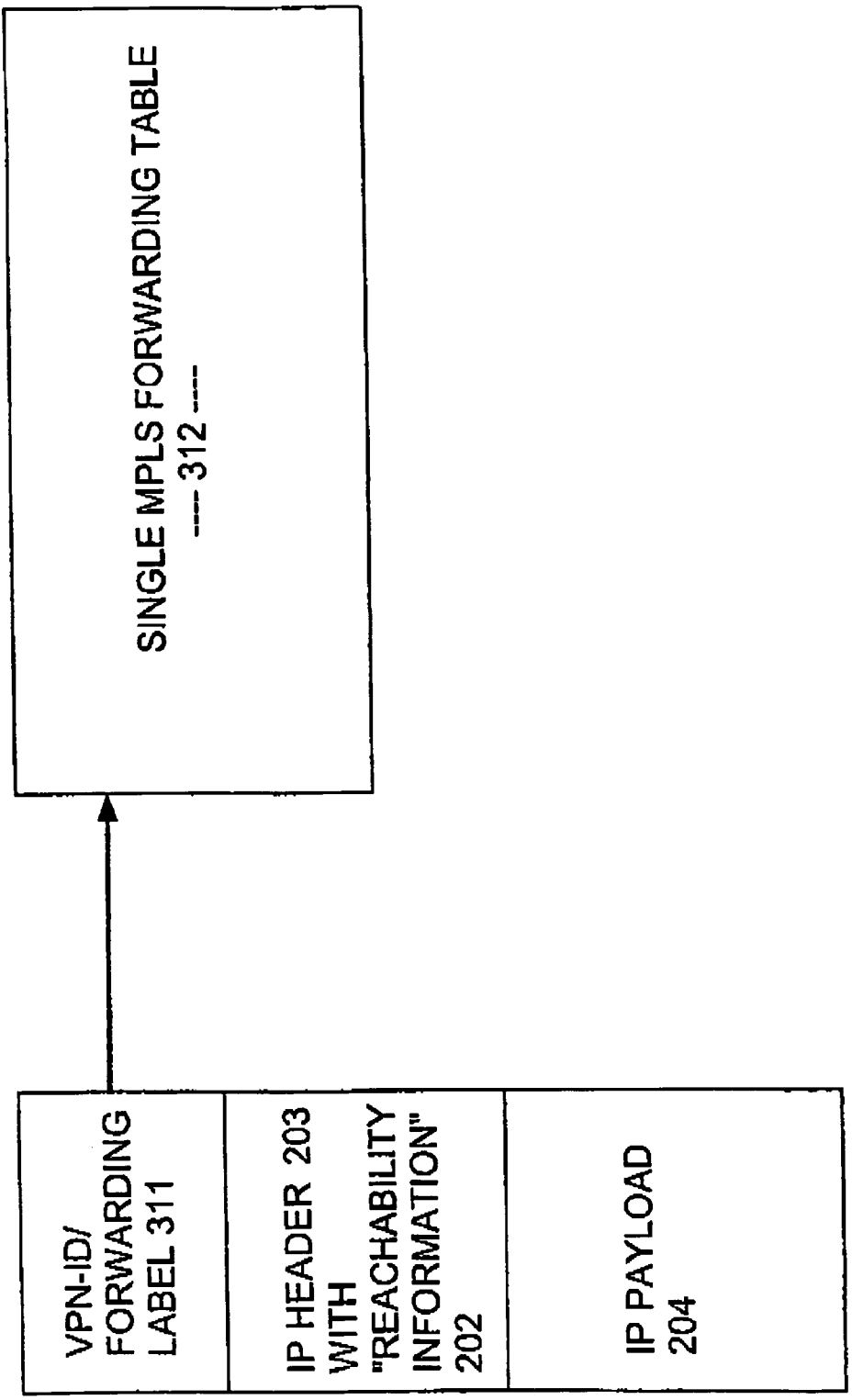

METHOD AND APPARATUS FOR VIRTUAL OVERLAY NETWORKS

BACKGROUND OF THE INVENTION

1. Field of the Invention

The present invention relates to the field of networking and more specifically to virtual overlay networks (VONs) and virtual private networks (VPNs).

2. Description of the Related Art

Virtual private networks (VPNs) allow users to appear to be on the same private network although there may be many (usually public) networks in between the users. FIG. 1A illustrates the logical appearance to users of a virtual private network. FIG. 1B illustrates a high level view of the actual network configuration.

Packets destined from one user (say in Chicago in the illustration of FIG. 1B) to another user (say in Boston in the illustration of FIG. 1B) may be transmitted through an internet service provider (ISP) which supports VPNs. Each site connected to the ISP network advertises to the ISP a set of destinations reachable within the site. The ISP then redistributes this information to all other sites in the set of sites which form the VPN. This process is further described in Heinanen, et al., VPN support with MPLS, Internet Draft, March 1998.

Since the ISP may support multiple VPNs, and since these VPNs may use private address spaces (and, thus the addresses spaces may be non-unique), the routing system within the ISP needs to be able to unambiguously differentiate reachability information (i.e., private address space information) for the various VPNs. Heinanen, et al describes that this may be accomplished by having the ISP assign each VPN its own VPN identifier (VPN-ID) and having the routing system use a combination of the VPN-ID and the reachability information provided by the sites for routing. In such a system, a single routing system may support multiple VPNs whose address spaces overlap with each other.

FIG. 2 illustrates an exemplary prior art routing system using VPN-IDs and reachability information provided by the sites for routing. As illustrated by FIG. 2, a packet to be routed may include a virtual private network identifier (VPN-ID) 201, reachability information (e.g., private addressing information) 202, an internet protocol (IP) header 203 and payload information 204. A single route table 206 is maintained and is indexed by the combination of the VPN-ID 201 and the reachability information 202.

As is shown in FIG. 2, prior art solutions provide a flat address routing space by simply combining the VPN-ID with the reachability information provided by the sites.

It would be useful to provide more fine-grained control over the routed topology for individual VPNs.

SUMMARY OF THE INVENTION

A method and apparatus for directing messages through a network wherein multiple tables for directing messages through the network are maintained and provided. Each table corresponds to a virtual private network and contains routing information specific to that virtual private network. A separate routing table is maintained for each virtual private network. In one embodiment the messages are forwarded using plain IP forwarding, based on a route table corresponding to the virtual private network. In another embodiment separate forwarding tables using labels are generated for each virtual private network. In a third embodiment, a single forwarding table is utilized where the forwarding table is created based on separate routing tables for each virtual private network.

BRIEF DESCRIPTION OF THE DRAWINGS

FIG. 3C illustrates a third embodiment of a packet/routing table arrangement as may be implemented by the present invention.

Figure 1A:
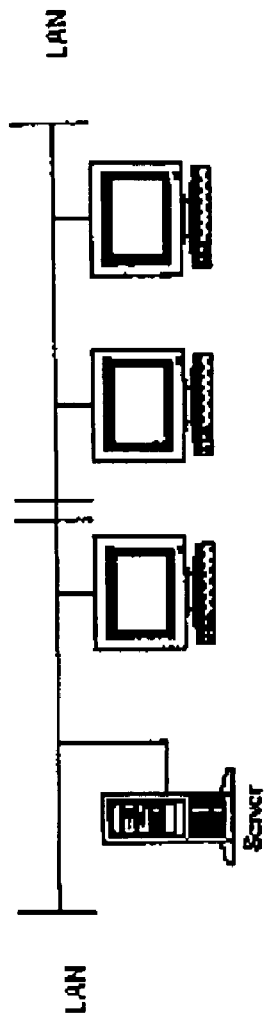
FIG. 1A illustrates a logical representation of a virtual private network.
Figure 1B:
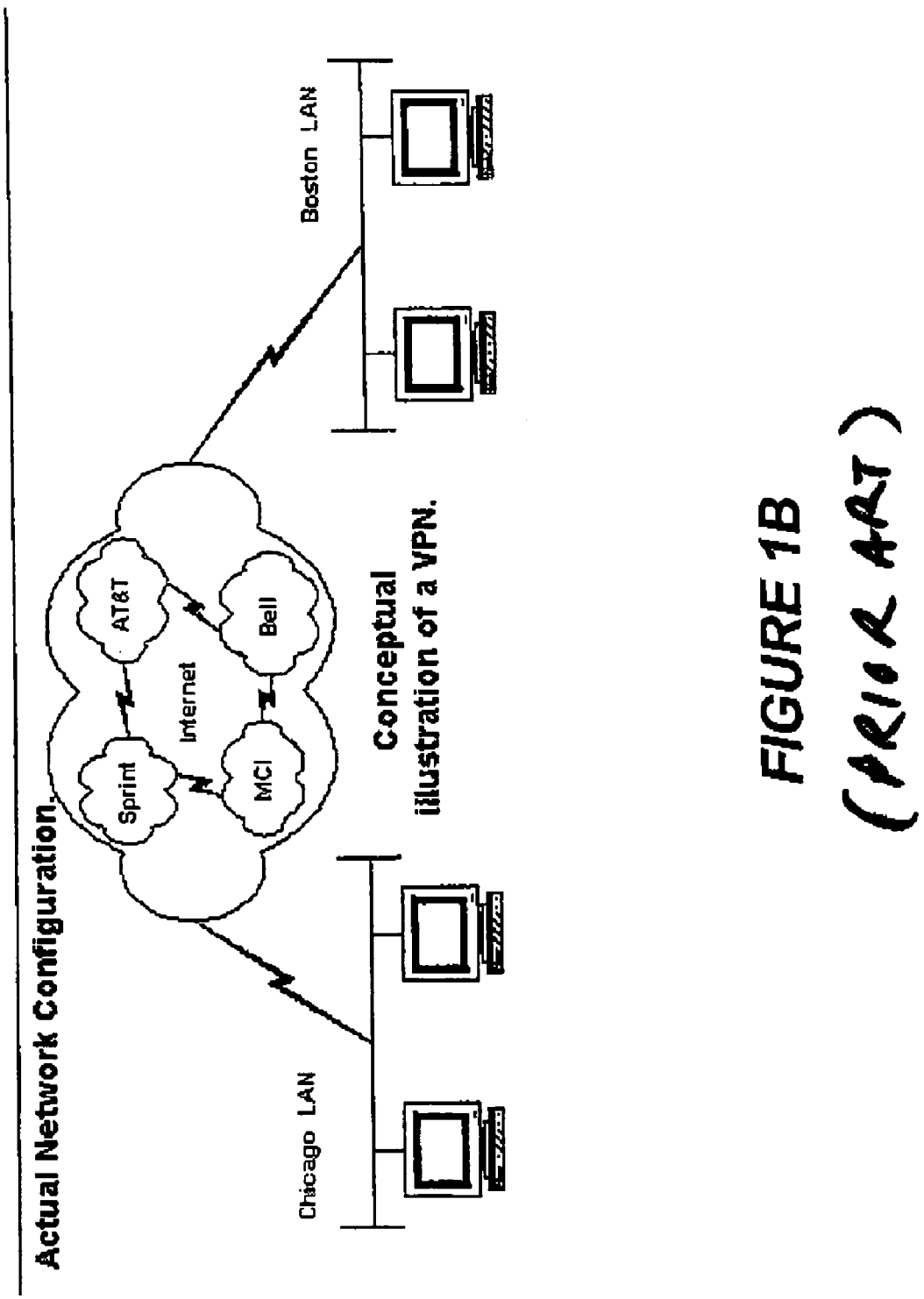
FIG. 1B illustrates a high level conceptual representation of virtual private network.
Figure 2:
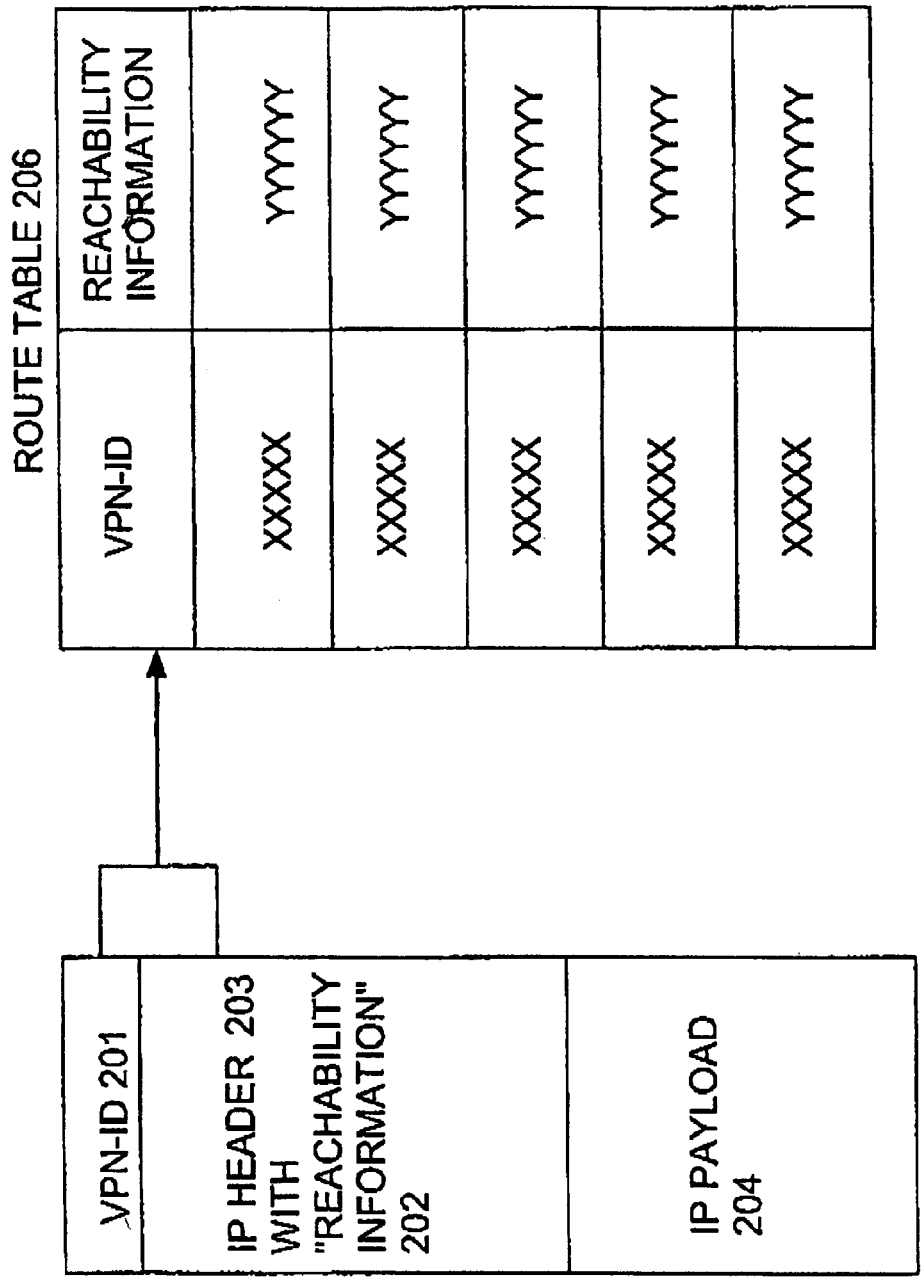
FIG. 2 illustrates a prior art packet/routing table arrangement.

For ease of reference, it might be pointed out that reference numerals in all of the accompanying drawings typically are in the form "drawing number" followed by two digits, xx; for example, reference numerals on FIG. 1 may be numbered 1xx; on FIG. 3, reference numerals may be numbered 3xx. In certain cases, a reference numeral may be introduced on one drawing and the same reference numeral may be utilized on other drawings to refer to the same item.

DETAILED DESCRIPTION OF THE EMBODIMENTS THE PRESENT INVENTION

As was discussed above, Virtual private networks (VPNs) allow users to appear to be on the same private network although there may be many (usually public) networks in between the users.

Packets destined from one to another user may be transmitted through an internet service provider (ISP) which supports VPNs. Each site connected to the ISP network advertises to the ISP a set of destinations reachable within the site. The ISP then redistributes this information to all other sites in the set of sites which form the VPN. Since the ISP may support multiple VPNs, and since these VPNs may use private address spaces (and, thus the addresses spaces may be non-unique), the routing system within the ISP needs to be able to unambiguously differentiate reachability information (i.e., private address space information) for the various VPNs.

A similar issue regarding need to unambiguously differentiate reachability information exists with Virtual Overlay Networks (VONs). VONs provide the capability to build logical independent networks over a shared public network infrastructure. VONs are particularly attractive to bandwidth and network infrastructure wholesalers and can also benefit both ISPs and private enterprise networks. VONs allow logical partitioning of networks without building expensive filtering mechanisms. For example, multiple small ISPs could share the same network infrastructure (consisting of, e.g., high bandwidth links and high end router devices) while each ISP could be provisioned to offer specific and tailored services (e.g., real time multicast service) to targeted customers. The concept could also be applied in the context of a single ISP when it sells services to different private customers. Each ISP could have a routed topology that is optimized for its needs—it will only use those nodes and those links that it requires to provide services. This logical separation allows a single high bandwidth network infrastructure with high bandwidth routers to be shared by many small ISPs offering specialized services. Alternatively it allows a single ISP to partition its network into nodes and links that are used for specialized services and those that are used to carry primarily best effort traffic.

In the present invention such logically separated routed topologies are maintained for each VPN. A packet belonging to a VPN is identified by its VPN-ID. The VPN-ID is placed in the label field as defined by the Multi-protocol label switching standard, see Callon et al., A Framework for Mulitprotocol Label Switching, November, 1997. In one embodiment, the VPN-ID is not used for forwarding, but merely identifies a routing table belonging to a particular VPN. In this embodiment the packet is forwarded by doing a standard IP destination address look-up on the table identified by the VPN-ID. In another embodiment, the VPN-ID identifies an MPLS forwarding table corresponding to the VPN where the MPLS forwarding table is built based on the routing table corresponding to the VPN. In a third embodiment, the VPN-ID is a part of the MPLS forwarding label. A single MPLS forwarding table is built based on a separate route table for each VPN and the forwarding is done by looking up the MPLS label (comprising of the VPN-ID part and a forwarding label part) in the forwarding table.

This approach of providing a logically separated routed topology for each VPN offers significant advantages over prior art approaches. Utilizing this approach, an ISP may, for example;

1. choose which links and nodes are in a given VPN;
2. assign a given link different administrative weights for different VPNs;
3. allocate different service levels/guarantees for different VPNs or provisions the service levels and guarantees differently;
4. use different routing protocols for the different VPNs; and
5. completely isolate the traffic of one VPN from another.

Figure 3A:
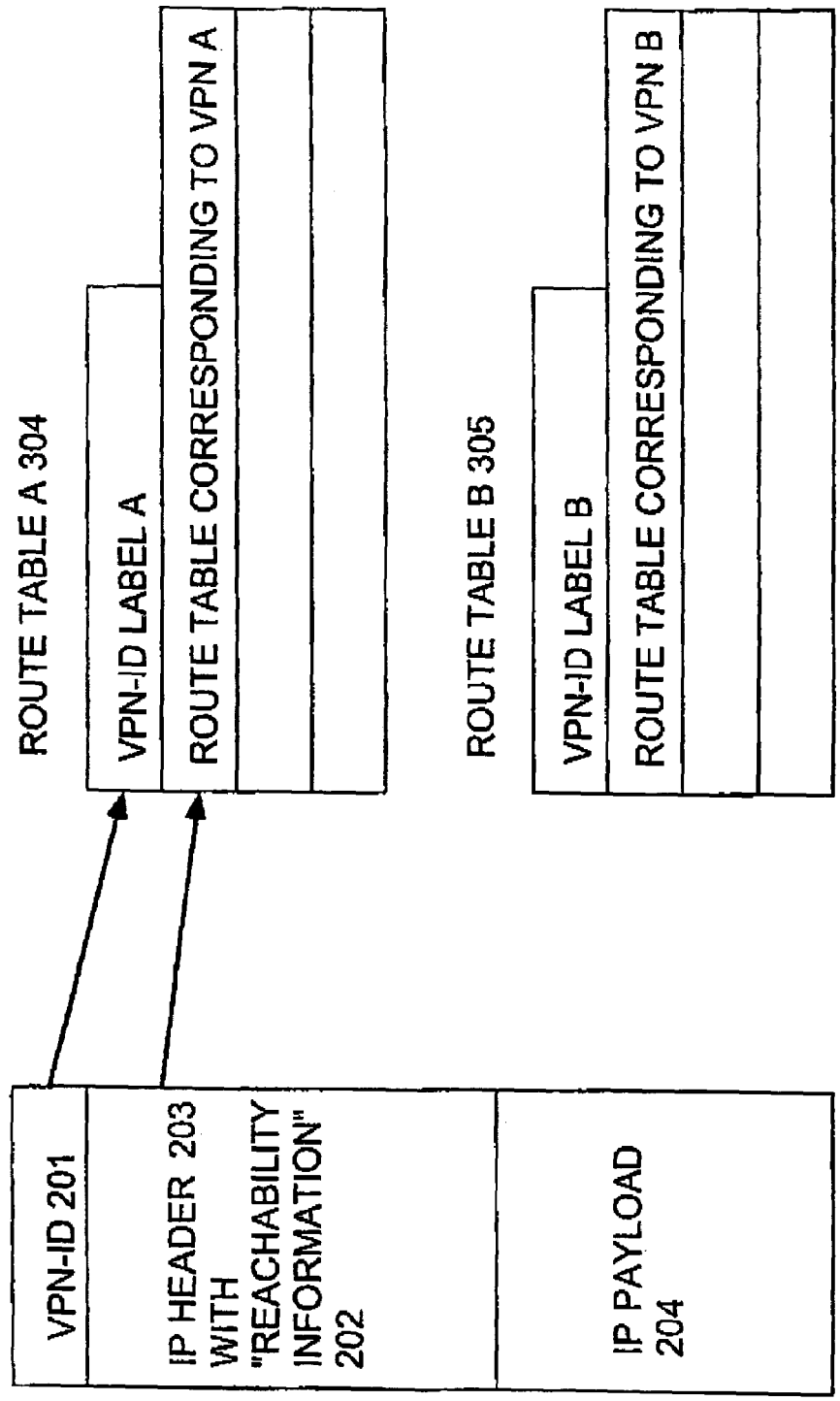
FIG. 3A illustrates a first embodiment of a packet/routing table arrangement as may be implemented by the present invention.

Multi Protocol Label Switching (MPLS) is used on the data plane in certain embodiments of the present invention. MPLS is described in greater detail in Callon et al. MPLS is intended to simplify the forwarding function of routing devices by introducing a connection-oriented mechanism inside the otherwise connectionless IP technology. A label switched path (LSP) is set up for each route. Edge routers analyze the traditional IP header (such as IP header 203) to decide which LSP to use and add a corresponding label switched path identifier in the form of a label (such as is shown in FIG. 3A as VPN-ID 201, in FIG. 3B as VPN-ID 201 and forwarding label 302, and in FIG. 3C as VPN-ID/ forwarding label 311).

As will be described, MPLS may be used to facilitate implementation of logically separated VPNs.

Figure 4:
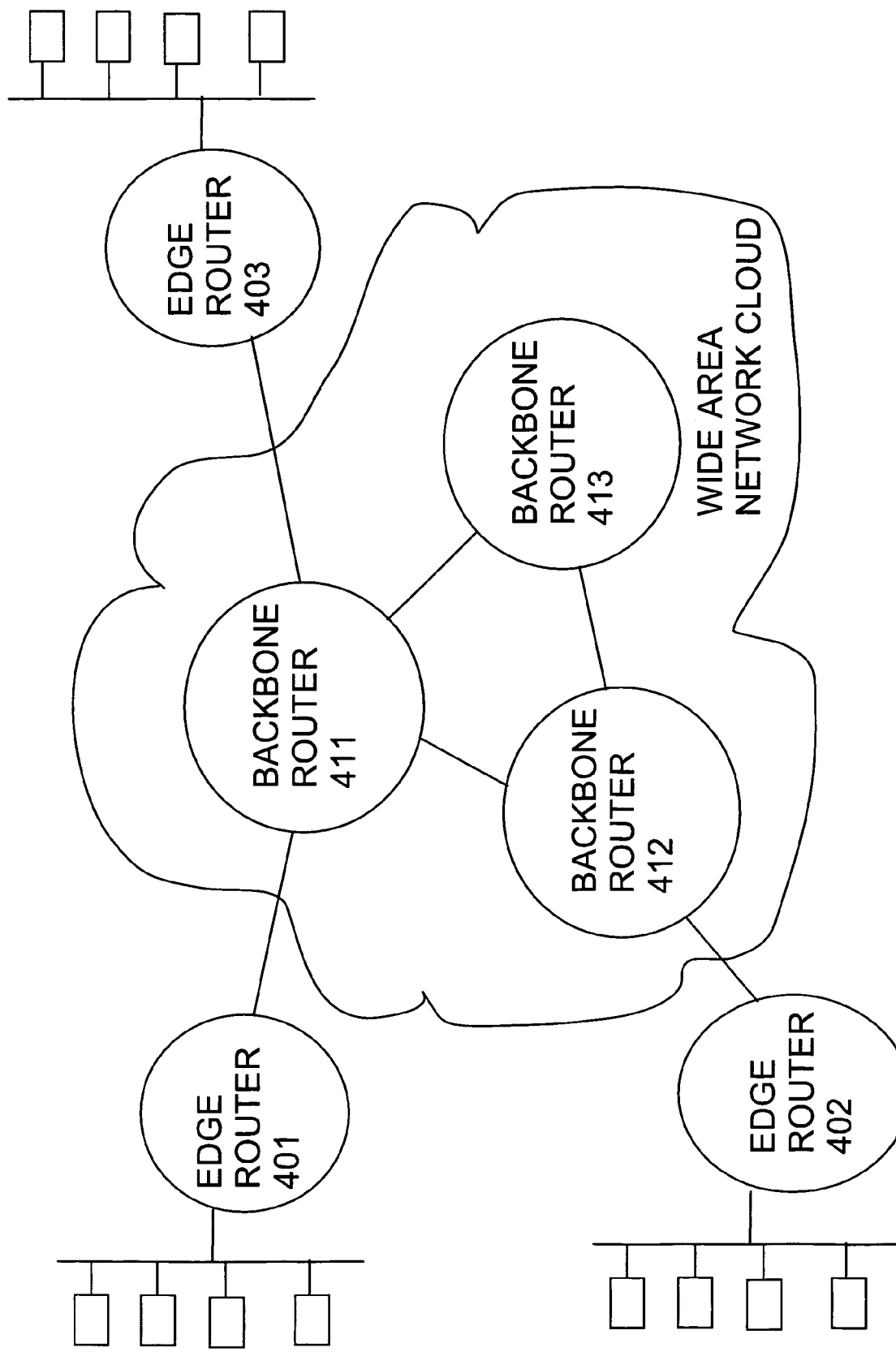
FIG. 4 is a high level diagram illustrating a network as may implement the present invention.

FIG. 4 provides a high level overview of a network as may implement the present invention. An edge router (such as router 401, 402 or 403) which resides at the enterprise or alternatively, at the ISP's site. The edge router 401-3 classifies packets onto a given VPN. The packet-to-VPN classification may be based on standard filtering techniques (e.g., input port and IP header mask). The edge router 401–403 then applies a VPN-specific label to the packet so that it can be routed by the backbone routers 411–413 in the wide area network cloud.

Three alternative approaches for providing logically separated routed topologies are described in connection with FIGS. 3A–C.

Turning first to FIG. 3A, the label (e.g., VPN-ID 201) is used to identify a muting table for 304 or 305. The packet is then routed based on the reachability information in the IP header 203. In this embodiment, no label distribution protocol (e.g. MPLS) is required. In another embodiment, the packet may include a first header and a second header.

Figure 3B:
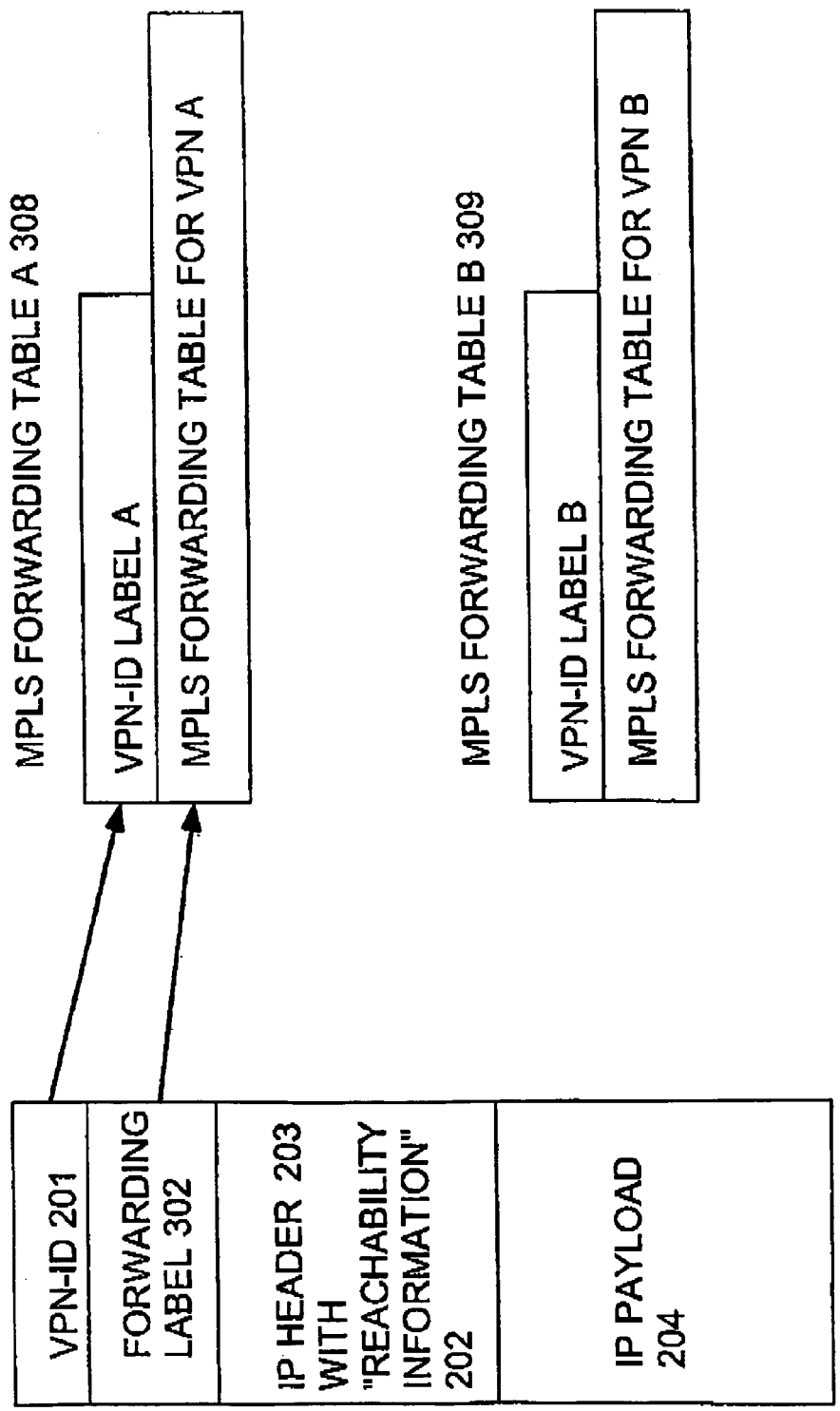
FIG. 3B illustrates a second embodiment of a packet/routing table arrangement as may be implemented by the present invention.

FIG. 3B illustrates an approach utilizing a label stack comprising the VPN-ID 201 and a forwarding label 302. In this embodiment, the VPN-ID 201 indicates an MPLS forwarding table 308, 309 which corresponds to the VPN-ID. The forwarding label 302 provides MPLS label switching information. By utilizing this embodiment, multiple instances of the standard MPLS distribution protocol can be utilized.

Finally, turning to FIG. 3C, each router is allowed to manage its own MPLS flat label space. Each router is responsible for keeping track of which VPN each label refers to and for routing them accordingly. The router locally builds the labels based on its route tables and VPN-ID information and stores them in a single MPLS forwarding table 312. In this embodiment, the router still maintains separate route tables for each VPN. In the described embodiment, as illustrated by FIG. 3C, this is accomplished by extending the label distribution protocol to carry a VPN-ID with the forwarding label as a combined VPN-ID/forwarding label 311.

Thus, what has been disclosed a method and apparatus for maintaining logically separate routing topologies based on virtual private networks.

What is claimed is:

1. A router for routing a packet belonging to a virtual private network (VPN) and having a label that includes a virtual private network identifier (VPN-ID) according to the Multiprotocol Label Switching (MPLS) standard and a forwarding label, the router comprising:
    a) a first forwarding table associated with the VPN, from among one or more separate forwarding tables, each forwarding table associated with a different VPN; and
    b) a processor for routing the packet based on an association between the VPN-ID), the forwarding label, and the first forwarding table.

2. The router as recited by claim 1 wherein the forwarding table includes a portion of a route table.

3. The router as recited by claim 1 further having a port for transmitting said packet.

4. A method of routing a packet in a network, the packet belonging to a virtual private network (VPN) and having a label that includes a virtual private network identifier (VPN-ID) according to the Multiprotocol Label Switching (MPLS) standard and a forwarding label, the method comprising:
    a) maintaining a first forwarding table corresponding to a first virtual private network;
    b) maintaining a second forwarding table corresponding to a second virtual private network; and
    c) routing the packet based on an association between the VPN-ID, the forwarding label, and one of the first forwarding table and the second forwarding table.

5. The method of claim 4, wherein the VPN-ID is contained in a first label in the header.

6. The method of claim 4, wherein the routing of the packet is based on information in the header.

7. The method of claim 4 wherein the first forwarding table includes a first portion of a route table and the second forwarding table includes a second portion of the route table.

8. The method of claim 7 further comprising:
    identifying, from the forwarding table, label switching information for routing the packet to the VPN.

9. The method of claim 4, wherein routing of the packet is based on information in the forwarding table.

10. A network comprising:
   a) a first edge router configured to route a packet through a wide area network cloud, the packet belonging to a virtual private network (VPN), having a label that includes a virtual private network identifier (VPN-ID) according to the Multiprotocol Label Switching (MPLS) standard, and a second label identifying forwarding table corresponding to the virtual private network, the forwarding table including a portion of the route table;
   b) a backbone router configured to receive the packet and route the packet based on a route table associated solely with the VPN-ID, from among one or more separate route tables, each table associated with a different VPN; and
   c) a second edge router configured to receive the packet.

11. The network as recited by claim 10 wherein the label farther includes a forwarding label.

12. The network as recited by claim 10 wherein the backbone router comprises a second route table.

13. A method of routing a packet belonging to a virtual private network (VPN) and having a label that includes a virtual private network identifier (VPN-ID) according to the Multiprotocol Label Switching (MPLS) standard and a forwarding label corresponding to a forwarding table, the method comprising:
   a) receiving the packet;
   b) identifying a rotting table associated with the VPN from among multiple separate routing tables associated with different VPNs; and
   c) facilitating routing of the packet to the VPN.

14. The method of claim 13, wherein the VPN-ID is contained in a first label in the header.

15. The method of claim 13, wherein the routing of the packet is based on information in the header.

16. The method of claim 14 wherein the forwarding table includes a portion of a route table.

17. The method of claim 16 further comprising:
   identifying, from the forwarding table, label switching information for routing the packet to the VPN.

18. The method of claim 17, wherein routing of the packet is based on information in the forwarding table.

19. A method of routing a packet belonging to a virtual private network (VPN) and having a label that includes a virtual private network identifier (VPN-ID) according to the Multiprotocol Label Switching (MPLS) standard in a first label in a header, the method comprising:
   a) receiving the packet;
   b) identifying a route table associated with the VPN from among multiple separate route tables associated with different VPNs;
   c) identifying, from a second label, a forwarding table corresponding to the VPN, the forwarding table including a portion of the route table; and
   d) facilitating routing of the packet to the VPN.

20. The method of claim 19, wherein the routing of the packet is based on information in the header.

21. The method of claim 19 further comprising:
   identifying, from the forwarding table, label switching information for routing the packet to the VPN.

22. The method of claim 21, wherein routing of the packet is based on information in the forwarding table.

23. The method of claim 19 wherein the label includes a forwarding label corresponding to a forwarding table.

* * * * *